(12) United States Patent
Singaraju et al.

(10) Patent No.: US 8,009,911 B2
(45) Date of Patent: Aug. 30, 2011

(54) INTERACTIVE IMAGE SEGMENTATION ON DIRECTED GRAPHS

(75) Inventors: Dheeraj Singaraju, Baltimore, MD (US); Leo Grady, Yardley, PA (US)

(73) Assignee: Siemens Aktiengesellschaft, München ( * ) Notice: Subject to any disclaimer, the term of this patent is extended or adjusted under 35 U.S.C. 154(b) by 763 days.

(21) Appl. No.: 12/047,412

(22) Filed: Mar. 13, 2008

(65) Prior Publication Data

US 2009/0060333 A1    Mar. 5, 2009

Related U.S. Application Data

(60) Provisional application No. 60/968,995, filed on Aug. 30, 2007.

(51) Int. Cl.
*G06K 9/00* (2006.01)
(52) U.S. Cl. ........................................ 382/173; 382/199
(58) Field of Classification Search .................. 382/173, 382/199, 266
See application file for complete search history.

(56) References Cited

U.S. PATENT DOCUMENTS 5,881,170 A * 3/1999 Araki et al. ................... 382/199
7,627,175 B2 * 12/2009 Le Clerc et al. .............. 382/173

OTHER PUBLICATIONS

Boykov, Yuri et al., "Interactive Graph Cuts for Optimal Boundary and Region Segmentation of Objects in N-D Images", *Proceedings of "Int. Conf. on Comp. Vision"*, Vancouver, Jul. 2001, page vol. I, 105-112, 105-112.
Grady, Leo "Random Walks for Image Segmentation", *IEEE Trans. Pattern Anal. and Mach. Int.*, vol. 28 No. 11 Nov. 2006, 1-17.
Boykov, Yuri et al., "Graph Cuts and Efficient N-D Image Segmentation", *International Journal of Com uter Vision*, 70(2), 109-131, 2006, 109-131.

* cited by examiner

*Primary Examiner* — Phuoc Tran
(74) *Attorney, Agent, or Firm* — Donald B. Paschburg

(57) ABSTRACT

Methods for segmentation of an object from a background in an image are disclosed. Segmentation is achieved by an adapted Random Walker segmentation method using directed edges in a graph. The segmentation applies the minimization of an approximation of an energy function. A minimizer of the approximated energy function can be found by using iterative steps. Weights are assigned to an edge between two nodes. The weights are dependent on the direction of an edge. A system for segmentation of an object from a background is also disclosed.

20 Claims, 8 Drawing Sheets

INTERACTIVE IMAGE SEGMENTATION ON DIRECTED GRAPHS

CROSS-REFERENCE TO RELATED APPLICATIONS

This application claims the benefit of U.S. Provisional Application No. 60/968,995, filed Aug. 30, 2007, which is incorporated herein by reference.

BACKGROUND OF THE INVENTION

The present invention relates to methods and apparatus for image segmentation for separation of a foreground object from a background. More in particular it relates to interactive segmentation of an object by using a directed graph.

Image segmentation refers to the problem of dividing an image into a number of disjoint regions such that the features of each region are consistent with each other. One can choose from a wide variety of features such as image intensity, texture and motion information in order to segment an image. Since images provide a vast bank of visual features for the same, image segmentation finds numerous applications in scene understanding. The problem of segmentation has been investigated extensively in the past, but most of the existing work is pertinent to the unsupervised framework where it is assumed that all the image features can be separated into distinct clusters/subspaces. In reality, this is not necessarily the case because images can be cluttered with a lot of visual information and the user is often interested only in a particular region of the image. The problem therefore becomes one of segmenting an object in the image from the remaining background, and requires a semi-supervised algorithm where the user can obtain a desired segmentation with sufficient interaction. The interaction usually takes the form of initializing a contour near the object boundary, or by marking certain pixels corresponding to the object and the background. Such frameworks find immediate applications in medical images where one wants to segment a particular anatomical structure from the rest of the image.

There exist various genres of methods that address the problem of supervised image segmentation, but in recent times, the graph-theoretic approaches have become more popular than the rest. These methods have enjoyed increasing popularity due to a various number of reasons, the primary ones being low run-times and the assurance of obtaining a global optimum. They typically proceed by constructing a combinatorial graph such that every node on the graph corresponds to a pixel in the image. Neighboring nodes are then connected by edges whose weights are indicative of the similarities between the features of the nodes. After the graph is constructed, the user is required to define the internal Dirichlet boundary conditions in the graph by labeling a few pixels that act as seeds for the object and background. Subsequently, the methods minimize an energy function which is defined on the combinatorial graph such that the minimizer gives the desired segmentation.

A commonly used approach in this category is the interactive graph cuts method introduced by Boykov et al. as described in "Y. Boykov and G. Funka-Lea. Graph Cuts and Efficient N-D Image Segmentation. *International Journal of Computer Vision*, 70(2):109-131, 2006. 1" and in "Y. Boykov and M.-P. Jolly. Interactive Graph Cuts for optimal Boundary and Region Segmentation of Objects in N-D Images. In *ICCV*, pages 105-112, 2001. 1", that segments an image by solving a max-flow/min-cut problem on the graph. In general, the method gives good segmentations at low computational costs. However, the results can be erroneous if the images contain weak edges that are categorized by the boundaries of objects being either incoherent or absent in certain regions. Such scenarios can result in gross misclassification of the unlabeled pixels due to what is commonly referred to as the small cuts problem. In addition, since the method minimizes an $L_1$ error to solve the segmentation problem, the results are often blocky and lack smoothness.

These issues can often be resolved by placing seeds around the areas where the detected object boundary is wrong. However, this means that the method requires an increased level of user interaction to produce accurate segmentations.

A popularly used method that overcomes most of these disadvantages is the random walker based scheme introduced by Grady in "L. Grady. Random Walks for Image Segmentation. *IEEE Trans. Pattern Anal. Mach. Intell*, 28(11):1768-1783, 2006. 2". The segmentation is determined from the solution to the Dirichlet problem with boundary conditions given by the seeds. The labeling of an unmarked pixel is obtained as the probability of whether a random walker starting from that pixel would first reach the object or the background. This method can produce the desired segmentation with a fewer number of seeds than the graph cuts method and has the powerful ability to handle weak edges. Since the algorithm minimizes an $L_2$ error, the object boundary that is obtained is smooth. It is worth noting that while the random walker approach offers significant advantages over the graph cuts method, it does not have the ability to use directed edges. The edges of the graph in the random walker framework are undirected and plainly represent the similarity between features. The graph cuts method, however allows the graph to have directed edges by penalizing the flow from object to background differently as compared to the flow from background to object. It has been convincingly demonstrated by example that directed edges do help in improving the segmenting power of a segmentation method.

Accordingly, novel and improved methods and apparatus for interactive image segmentation that extends the aforementioned random walker method to incorporate the beneficial use of directed edges are required.

SUMMARY OF THE INVENTION

Herein, as an aspect of the present invention a method and an apparatus for implementing an algorithm for interactive image segmentation will be presented that extends the aforementioned random walker algorithm to incorporate the use of directed edges. An energy function will be defined on a combinatorial graph with directed edges such that its minimizer provides the required segmentation. It will be proven that the energy function is convex on its domain and has a unique minimum. An outline will be provided of a numerical scheme for minimizing this energy and prove that it converges to the minimum. Also, the construction of an equivalent electrical network will be described that solves the same segmentation problem as the present framework provided herein. This construction helps appreciate the migration from the classical random walker framework to the method herein provided as an aspect of the present invention.

One aspect of the present invention presents a novel method and system that will provide an improved segmentation of an object from a background in an image.

In accordance with another aspect of the present invention, a method is provided for segmentation of an object from a background in an image having a plurality of pixels, comprising defining an energy function on a combinatorial graph, the combinatorial graph having directed edges between nodes, the energy function depending on the value of a first and a second edge weight of a directed edge, the energy function being determined by an expression $$E(x) = \sum_{e_{ij} \in \varepsilon} [w_{ij} I(x_i \geq x_j) + w_{ji} I(x_i < x_j)](x_i - x_j)^2;$$

and creating a contour that segments the plurality of pixels into background and foreground pixels by determining a minimizer of the energy function.

In accordance with a further aspect of the present invention, a method is provided for segmentation of an object from a background in an image having a plurality of pixels, wherein an energy function is approximated by a differentiable function which descends to a minimum.

In accordance with another aspect of the present invention, a method is provided for segmentation of an object from a background in an image having a plurality of pixels, wherein the first and the second edge weight of a directed edge are different.

In accordance with a further aspect of the present invention, a method is provided for segmentation of an object from a background in an image having a plurality of pixels, wherein an approximation of an energy function can be expressed as $$E_\in(x) = \sum_{e_{ij} \in \varepsilon} \frac{(x_i - x_j)^2}{2R_{ij}} \left(1 + \frac{2}{\pi} \tan^{-1}\left(\frac{x_i - x_j}{\in}\right)\right) +$$

$$\sum_{e_{ij} \in \varepsilon} \frac{(x_i - x_j)^2}{2R_{ji}} \left(1 - \frac{2}{\pi} \tan^{-1}\left(\frac{x_i - x_j}{\in}\right)\right).$$

In accordance with another aspect of the present invention, a method is provided for segmentation of an object from a background in an image having a plurality of pixels, further comprising determining the minimizer in a plurality of iterative steps.

In accordance with a further aspect of the present invention, a method is provided for segmentation of an object from a background in an image having a plurality of pixels, wherein the weight of a directed edge between a first and a second node depends on an increase of intensity going from the first to the second node.

In accordance with another aspect of the present invention, a method is provided for segmentation of an object from a background in an image having a plurality of pixels, wherein the weights of a directed edge between a first and a second node are determined automatically based on an image feature at object and background seeds.

In accordance with a further aspect of the present invention, a system is provided for segmentation of an object from a background in an image having a plurality of pixels, comprising a processor; a memory readable by the processor, the memory comprising program code executable by the processor, the program code adapted to perform the following steps: defining an energy function on a combinatorial graph, the combinatorial graph having directed edges between nodes, the energy function depending on the value of a first and a second edge weight of a directed edge, the energy function being determined by an expression $$E(x) = \sum_{e_{ij} \in \varepsilon} [w_{ij} I(x_i \geq x_j) + w_{ji} I(x_i < x_j)](x_i - x_j)^2;$$

and creating a contour that segments the plurality of pixels into background and foreground pixels by determining a minimizer of the energy function.

In accordance with another aspect of the present invention, a system is provided for segmentation of an object from a background in an image having a plurality of pixels, wherein an energy function is approximated by a differentiable function which descends to a minimum.

In accordance with a further aspect of the present invention, a system is provided for segmentation of an object from a background in an image having a plurality of pixels, wherein the first and the second edge weight of a directed edge are different.

In accordance with another aspect of the present invention, a system is provided for segmentation of an object from a background in an image having a plurality of pixels, wherein an approximation of an energy function can be expressed as $$E_\in(x) = \sum_{e_{ij} \in \varepsilon} \frac{(x_i - x_j)^2}{2R_{ij}} \left(1 + \frac{2}{\pi} \tan^{-1}\left(\frac{x_i - x_j}{\in}\right)\right) +$$

$$\sum_{e_{ij} \in \varepsilon} \frac{(x_i - x_j)^2}{2R_{ji}} \left(1 - \frac{2}{\pi} \tan^{-1}\left(\frac{x_i - x_j}{\in}\right)\right).$$

In accordance with a further aspect of the present invention, a system is provided for segmentation of an object from a background in an image having a plurality of pixels, further comprising determining the minimizer in a plurality of iterative steps.

In accordance with another aspect of the present invention, a system is provided for segmentation of an object from a background in an image having a plurality of pixels, wherein the weight of a directed edge between a first and a second node depends on an increase of intensity going from the first to the second node.

In accordance with a further aspect of the present invention, a system is provided for segmentation of an object from a background in an image having a plurality of pixels, wherein the weights of a directed edge between a first and a second node are determined automatically based on an image feature at object and background seeds.

In accordance with another aspect of the present invention, a method is provided for segmentation of an object from a background in an image having a plurality of pixels wherein one or more pixels are marked as object, one or more pixels are marked as background and the remaining pixels are unmarked, comprising adapting a Random Walker segmentation method to a combinatorial graph having directed edges between nodes, a node of a graph representing a pixel of the image.

In accordance with a further aspect of the present invention, a method is provided for segmentation of an object from a background in an image having a plurality of pixels, wherein one or more pixels are marked as object, one or more pixels are marked as background and the remaining pixels are unmarked, wherein the adapted Random Walker segmentation method creates a contour that segments the plurality of pixels into background and object pixels by determining a minimizer of an energy function related to values of nodes and directed edges between nodes which can be expressed as $$E(x) = \sum_{e_{ij} \in \varepsilon} [w_{ij} I(x_i \geq x_j) + w_{ji} I(x_i < x_j)](x_i - x_j)^2.$$

In accordance with another aspect of the present invention, a method is provided for segmentation of an object from a background in an image having a plurality of pixels, wherein one or more pixels are marked as object, one or more pixels are marked as background and the remaining pixels are unmarked, wherein the energy function is approximated by a differentiable function.

In accordance with a further aspect of the present invention, a method is provided for segmentation of an object from a background in an image having a plurality of pixels, wherein the differentiable function can be can be expressed as $$E_\in(x) = \sum_{e_{ij} \in \varepsilon} \frac{(x_i - x_j)^2}{2R_{ij}} \left(1 + \frac{2}{\pi} \tan^{-1}\left(\frac{x_i - x_j}{\in}\right)\right) +$$

$$\sum_{e_{ij} \in \varepsilon} \frac{(x_i - x_j)^2}{2R_{ji}} \left(1 - \frac{2}{\pi} \tan^{-1}\left(\frac{x_i - x_j}{\in}\right)\right).$$

In accordance with another aspect of the present invention, a method is provided for segmentation of an object from a background in an image having a plurality of pixels, further comprising the steps initializing the values of unmarked nodes as previous minimizers; estimating a current minimizer of the differentiable energy function; making the current minimizer the previous minimizer if a difference between the current and the previous minimizer exceeds a preset number; and repeating the previous 2 steps.

In accordance with a further aspect of the present invention, a method is provided for segmentation of an object from a background in an image having a plurality of pixels, wherein the weights of a directed edge between a first and a second node are determined automatically based on object and background seeds.

DESCRIPTION OF A PREFERRED EMBODIMENT IMAGE SEGMENTATION BY ENERGY MINIMIZATION

Figure 1:
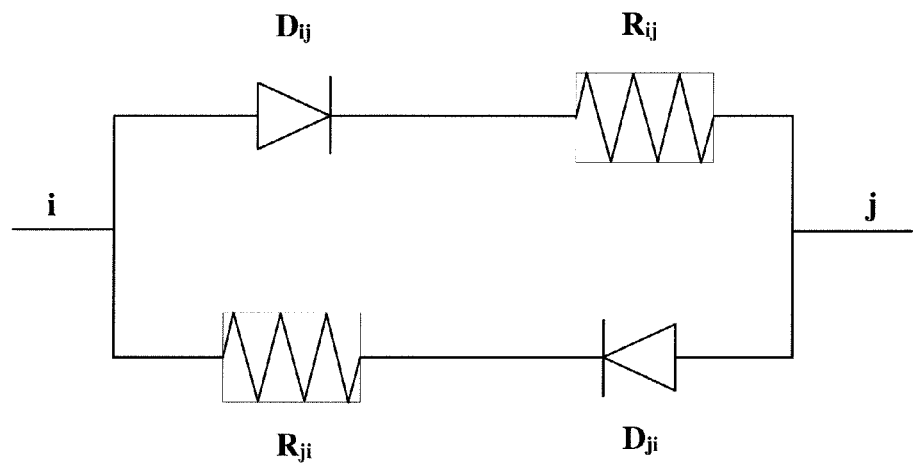
FIG. 1 is a diagram of a circuit illustrative to a segmentation method in accordance with an aspect of the present invention.

First, a brief review of the classical random walker algorithm for image segmentation will be provided. The Random Walker algorithm is also explained in detail in U.S. patent application Ser. No. 11/029,442 filed on Jan. 5, 2005 which is incorporated herein by reference in its entirety. Next a significant modification will be provided in the energy minimized by this method that will enable dealing with directed edges. A proof for the existence and uniqueness of a minimum to our proposed energy function will follow. Also provided is the construction of an equivalent electrical network that gives the desired segmentation. Parallels will be drawn that help provide an intuition for the working of the herein provided framework. More specifically, a solution will be provided for the following Problem 1.

Problem 1 (Interactive Segmentation of Image Features): Consider an image of size m×n with N=mn points and associated features $\{f_i\}_{i=1}^N$. Given seeds with labels O for the object and B for the background, find the labeling of the unmarked points and hence the segmentation.

First a formal definition of a graph will be provided. A graph G consists of a pair G(v,ε) with nodes $v_i \in v$ and edges $e_{ij} \in \varepsilon$. The nodes on the graph typically correspond to pixels in the image. An edge that spans two vertices $v_i$ and $v_j$ is denoted by $e_{ij}$. Since the graph has directed edges, the convention is followed that the edge is oriented from $v_i$ to $v_j$. One can construct a weighted graph by assigning to each edge $e_{ij}$ a non-negative value $w_{ij}$ that is referred to as its weight. Note that since the graph has directed edges, it is not necessary that $w_{ij} = w_{ji}$. The neighborhood of a node $v_i$ is given by all the nodes $v_j$ that it shares an edge with, and is denoted by $N(v_i)$. The set M contains the locations of the seeds and the set U contains the locations of the unmarked nodes. By construction $M \cap U = \emptyset$ and $V = M \cup U$.

The random walker algorithm proceeds by first defining the edge weights as $w_{ij} = e^{-\beta \|f_i - f_j\|^2}$, $\beta > 0$. The user defined seeds provide the boundary conditions on the graph. The seeds corresponding to the object and background are assigned values x=1 and x=0 respectively. The values $\{x_i\}_{i \in U}$ the unmarked nodes are then obtained as the solution to the Dirichlet problem with boundary conditions as $$\{x_i\}_{i \in U} = \operatorname{argmin} \sum_{e_{ij} \in \varepsilon} w_{ij}(x_i - x_j)^2. \quad (1)$$

By the maximum principle, the value of $x_i$ at any unmarked node $v_i$ is constrained to lie between 0 and 1. It represents the probability that a random walker starting from the node $v_i$ will reach the object seeds before the background seeds. Therefore by placing a decision boundary of x=0.5 on the values at the unmarked seeds, the algorithm obtains a segmentation of the image.

This setup has an interesting property that there exists an equivalent electrical network that solves exactly the same problem. The network is represented by the same graph constructed by the algorithm with every node in the graph corresponding to a node in the network. The edge weights correspond to the admittance values of resistive elements connected between neighboring nodes, i.e.

$$\frac{1}{R_{ij}} = w_{ij}.$$

The object seeds act as voltage sources and are at potential $x=1V$, while the backgrounds seeds provide the network's ground and are at potential $x=0V$. The potentials at the unmarked nodes distribute themselves such that they satisfy Kirchhoff's current and voltage laws. It can be shown that the potentials minimize the energy dissipated by the network, the expression of which is given exactly by "Y. Boykov and G. Funka-Lea. Graph Cuts and Efficient N-D Image Segmentation. *International Journal of Computer Vision*, 70(2):109-131, 2006. 1"

The construction of the aforementioned electrical network helps us appreciate why the random walker algorithm cannot deal with directed edges. The resistor is a symmetric network element and we note from the expression in "Y. Boykov and G. Funka-Lea. Graph Cuts and Efficient N-D Image Segmentation. *International Journal of Computer Vision*, 70(2):109-131, 2006. 1" that a transition from $v_i$ to $v_j$ is penalized the same as a transition from $v_j$ to $v_i$. The algorithm takes only pairwise interactions into account without attaching any sense of direction between pairs of nodes. In reality, one would want the penalties to be associated with an orientation, i.e. dependent on the direction of transition between a pair of nodes. The desired behavior is as described in the following table, which provides different penalty schemes for graphs with undirected edges and graphs with directed edges.

| Type of edges | Penalty for $x_i \geq x_j$ | Penalty for $x_i < x_j$ |
|---|---|---|
| Undirected ($w_{ij} = w_{ji}$) | $w_{ij}(x_i - x_j)^2$ | $w_{ij}(x_j - x_i)^2$ |
| Directed ($w_{ij} \neq w_{ji}$) | $w_{ij}(x_i - x_j)^2$ | $w_{ji}(x_j - x_i)^2$ |

To account for directed edges, the energy function being minimized must reflect that it has different penalties for different orientations of the potentials. Consequently as an aspect of the present invention the energy function minimized by the Random Walker algorithm is modified to estimate the memberships $\{x_i\}_{i \in U}$ of the unmarked nodes as the minimizer of $$E(x) = \sum_{e_{ij} \in \varepsilon} [w_{ij} I(x_i \geq x_j) + w_{ji} I(x_i < x_j)](x_i - x_j)^2,$$

subject to the constraints $x_i=1$, if $i \in O$ and $x_i=0$, if $i \in B$. $I(A)$ is used as an indicator function of the event A, such that $I(A)=1$ if the event A is true and $I(A)=0$ otherwise.

Estimating the minimizer of $E(x)$ is not straightforward. To this effect, an approximation of the original cost function $E(x)$ is provided, in order to render a relatively simple numerical analysis. In addition to paving the way for a simple optimization algorithm, the approximation which is provided as an aspect of the present invention also helps to establish the existence and uniqueness of the solution of the provided optimization problem. It is noted that the indicator functions $I(x_i \geq x_j)$ and $I(x_i < x_j)$ used in $E(x)$ are not differentiable on their entire support. In particular, they are not differentiable at the event A marked by $x_i=x_j$. As a result, the energy $E(x)$ is not a differentiable function of the node potentials in the circuit of FIG. 1 which will be explained in detail later, and this prevents a simple mathematical analysis of the network's properties.

To resolve the above issue the use of a sigmoidal function is employed to define an approximated energy function that satisfies the purpose. More specifically, the segmentation problem is posed as one of finding the minimizer of the energy given by $$E_\in(x) = \sum_{e_{ij} \in \varepsilon} \frac{(x_i - x_j)^2}{2R_{ij}} \left(1 + \frac{2}{\pi}\tan^{-1}\left(\frac{x_i - x_j}{\in}\right)\right) + \sum_{e_{ij} \in \varepsilon} \frac{(x_i - x_j)^2}{2R_{ji}} \left(1 - \frac{2}{\pi}\tan^{-1}\left(\frac{x_i - x_j}{\in}\right)\right). \quad (2)$$

for some $\in > 0$. Note that $E_\in(x)$ is a continuous function of $\in$ as well as of the node value x. It is easy to check that as $\in \to 0^+$, the energy function $E_\in(x)$ can be used to approximate the initial energy function $E(x)$ with required level of accuracy. It can further be easily checked that as $\in \to 0^+$, the sigmoidal function acts as a binary decision rule and helps assign a different weight for the edge between nodes $v_i$ and $v_j$ depending on whether $x_i \geq x_j$ or $x_i < x_j$. It is brought to the attention of the reader that one is now able to represent a Heaviside step function by a smooth differentiable function, and do so with sufficient accuracy. Note that the energy minimized by the random walker algorithm is a special case of $E(x)$ when $R_{ij}=R_{ji}$, $\forall e_{ij} \in \varepsilon$. A simple check by plugging $R_{ij}=R_{ji}$ in the subsequent analysis shows that the more general conclusions of the framework as an aspect of the present invention reduce to the standard results known about the classical random walker algorithm.

It is interesting to look at what implications this energy has in the domain of electrical networks. The values $x_i$ would have the same significance as in the classical random walker setup, i.e. they represent the potentials at the nodes in the network. The seeds for the object and background provide the voltage sources and the ground. However, it is not easy to see what the impedance between neighboring nodes would be. The expression in equation (2) of the present disclosure implies that the value of the impedance when the current flows from $v_i$ to $v_j$ is different from the value of the impedance when the current flows from $v_j$ to $v_i$. The desired behavior requires a dependency on the direction of the current flow and it is immediate to see that this can be achieved by constructing an electrical network with diodes and resistors. FIG. 1 shows a resistor-diode configuration in which the diodes are to be connected between neighboring nodes in order to introduce directed edges.

The diodes are assumed to be ideal, i.e. active if the potential drop across them is positive and off if the potential drop across them is negative. Therefore if $x_i$ is greater than $x_j$, the diode $D_{ij}$ is active and the diode $D_{ji}$ is off. The current flows from $v_i$ to $v_j$ and the value of the resistance between the nodes is equal to $R_{ij}$. By a similar argument one can see that if $x_j$ is greater than $x_i$, the current flows from $v_j$ to $v_i$ and the resistance between the nodes is $R_{ji}$. In particular, the current $I_{ij}$ flowing from $v_i$ to $v_j$ is given by the expression $$I_{ij} = \frac{(x_i - x_j)}{2R_{ij}}\left(1 + \frac{2}{\pi}\tan^{-1}\left(\frac{x_i - x_j}{\in}\right)\right) + \frac{(x_i - x_j)}{2R_{ji}}\left(1 - \frac{2}{\pi}\tan^{-1}\left(\frac{x_i - x_j}{\in}\right)\right). \quad (3)$$

If one were to construct an electrical network as described above, the potentials at the unlabeled nodes would stabilize to a steady state. The physical behavior of the network gives an intuition that the energy does have a unique minimum. In what follows, a rigorous mathematical proof will be provided for the same.

Note that the energy $E_\in(x)$ is a continuous smooth function of the potentials at all the nodes in the graph. However, since the potentials at the seeds are constant, the energy is modeled as a multivariate function that depends only on the potentials of the unmarked nodes. The potential at each of the unmarked nodes takes values in [0, 1] and therefore the energy $E_\in(x)$ is defined on the domain $D=[0,1]^{|U|}$. Since D is a compact set, the energy $E_\in(x)$ is bounded and attains its minimum on D.

Now, since $E_\in(x)$ is a differentiable function of the potentials, one knows that any minimizer of $E_\in(x)$ must be a stationary point i.e.

$$\frac{\partial E_\in(x)}{\partial x} = 0.$$

The $i^{th}$ entry of $$\frac{\partial E_\in(x)}{\partial x}$$

can be explicitly written as $$\frac{\partial E_\in(x)}{\partial x_i} = \sum_{j \in N(v_i)}\left[I_{ij} + \frac{\in}{2\pi}\left(\frac{1}{R_{ij}} - \frac{1}{R_{ji}}\right)\frac{(x_i - x_j)^2}{\in^2 + (x_i - x_j)^2}\right]. \quad (4)$$

where $i \in U$. It is easy to check that if one takes $\in$ to be very small then the contribution from the second term in the equation is very small. Since this contribution is insignificant, the stationary point can be estimated approximately by solving the system of equations $$\sum_{j \in N(v_i)} I_{ij} = 0, \, i \in U.$$

Note that this is exactly the solution obtained by applying Kirchhoff's current law at every unmarked node. This system of equations is guaranteed to have a solution in D, as a consequence of the earlier argument that $E_\in(x)$ achieves its minimum on D. One therefore has the result that the constructed electrical network helps in providing a stationary point of $E_\in(x)$.

It will be shown next that the energy function $E_\in(x)$ is convex on D by proving that its Hessian is always positive definite, thereby establishing that the stationary point is the unique minimizer of D. Consider a weighted graph with undirected edges, or in other words $w_{ij}=w_{ji}=a_{ij}$, $e_{ij} \in \epsilon$. One can then define a Laplacian L associated with the graph as $$L_{ij} = \begin{cases} -a_{ij} & \text{if } e_{ij} \in \varepsilon, \\ \sum_{k \in N(v_i)} a_{ik} & \text{if } i = j, \\ 0 & \text{otherwise.} \end{cases} \quad (5)$$

Now consider the expression of the Hessian of $E_\in(x)$ given by equation (6)

$$(H(x))_{ij} = \begin{cases} -\frac{1}{2}\left(\frac{1}{R_{ij}} + \frac{1}{R_{ji}}\right) - \frac{1}{\pi}\left[\tan^{-1}\left(\frac{x_i - x_j}{\in}\right) + \in\left(\frac{(x_i - x_j)^2 + 2\in^2}{(x_i - x_j)^2 + \in^2}\right)(x_i - x_j)\right]\left(\frac{1}{R_{ij}} - \frac{1}{R_{ji}}\right) & \text{if } e_{ij} \in \varepsilon, \\ -\sum_{k \in N(v_i)}(H(x))_{ik} & \text{if } i = j, \\ 0 & \text{otherwise.} \end{cases} \quad (6)$$

One can see that the Hessian H(x) takes the form of a submatrix $\bar{L}$ of the Laplacian matrix L. More specifically, $\bar{L}$ is obtained by eliminating the rows and columns with the seeds' indices from the matrix L. One can verify that by choosing small values of $\in$, the off-diagonal entries of the Hessian are negative. Therefore it serves the present purpose to prove that such a submatrix of the Laplacian is positive definite if all the edge weights in the graph are positive. One would then have established that H(x) is positive definite and that $E_\in(x)$ is a convex function, thereby proving the uniqueness of the minimum.

Lemma 1: $\bar{L}$ is positive definite if all the edge weights $a_{ij} > 0$ for $i,j=1, \ldots, N$. Proof. Consider a vector $X=[x_1, \ldots, x_{|U|}]^T \in \Re^{|U|}$. To check for positive definiteness, inspect the value of $2X^T\bar{L}X$ as given by $$2X^T\bar{L}X = \sum_{i,j \in U}\sum_{e_{i,j} \in \varepsilon}\frac{(x_i - x_j)^2}{a_{ij}} + \sum_{i \in U, j \in M}\sum_{e_{i,j} \in \varepsilon}\frac{x_i^2}{a_{ij}}. \quad (7)$$

Since all the weights are positive, the expression in (7) is a sum of non-negative terms and is always positive unless each of the terms in the summation is identically equal to zero. On enforcing the constraint that each of the terms in the first summation is zero, one can see that the potentials at any two neighboring unmarked nodes are required to be equal to each other. A similar constraint on the terms in the second summation requires the potentials of the unmarked nodes that share edges with the seeds, to be equal to zero. Therefore, noting that the constructed graph is completely connected, the expression $2X^T\bar{L}X$ can be equal to zero if and only if the potentials of all the unmarked nodes are zero, i.e. X=0. Accordingly, one hence has the result that $\overline{L}$ is positive definite.

With the result of Lemma 1, one can correctly claim that the Hessian of the energy function is positive definite, provided that its off-diagonal entries are negative. From equation 6, one notes that this is true if the constraint $$\frac{2}{\pi}\left[\tan^{-1}\left(\frac{x_i - x_j}{\epsilon}\right) + \epsilon\left(\frac{(x_i - x_j)^2 + 2\epsilon^2}{(x_i - x_j)^2 + \epsilon^2}\right)(x_i - x_j)\right] \in (-1, 1)$$

is satisfied. By examining the first derivative of this expression, one can see that it is an increasing function of $(x_i-x_j)$. Therefore, if ones chooses $\in$ small enough such that $$\frac{2}{\pi}\left[\tan^{-1}\left(\frac{1}{\epsilon}\right) + \epsilon\left(\frac{1+2\epsilon^2}{1+\epsilon^2}\right)\right] < 1,$$

one would be assured that the Hessian is always positive definite.

In summary, an approximated energy function (as given in equation (2)) has been defined that models the pairwise interactions of nodes on a directed weighted graph. The energy is a convex function of the potentials at the unmarked nodes and has a unique minimum. The minimization of this energy can also be cast in the framework of electrical networks. The segmentation problem is posed as the minimization of the energy dissipated by an electric network with diodes and resistors. The seeds define the boundary conditions of the segmentation problem and act as voltage sources and ground of the network. The potentials at the unmarked nodes as solved by the network provide the required segmentation.

Numerical Scheme for Energy Minimization

In this section, the steps for numerically estimating the minimizer of the energy defined above will be provided. The fact that the diode is a non-linear device implies that the potentials cannot be obtained by solving a linear system as in the random walker approach. One can adopt a mesh analysis and solve for the mesh currents in the network. However, one does not have prior knowledge about which diodes are active and therefore need to enforce additional constraints that the current flowing across an edge is consistent with the direction of the active diode. This becomes a problem of quadratic programming which can be computationally cumbersome. Such issues can help in further appreciation of the mathematical model that is used for the diodes, since it renders the optimization scheme sufficiently simple. Recall that it was shown that the energy is a convex function of the potentials at the unmarked nodes and that it has a unique minimum. Therefore one can adopt any descent search algorithm in order to estimate the minimum.

For the sake of simplicity, a Laplacian matrix $L^x$ is defined whose entries depend on the graph's edge weights and the node potentials as $$L_{ij}^x = \begin{cases} -\frac{1}{2R_{ij}}\left(1 + \frac{2}{\pi}\tan^{-1}\left(\frac{x_i - x_j}{\epsilon}\right)\right) - \frac{1}{2R_{ji}}\left(1 - \frac{2}{\pi}\tan^{-1}\left(\frac{x_i - x_j}{\epsilon}\right)\right) & \text{if } e_{ij} \in \varepsilon, \\ -\sum_{k \in N(v_i)} L_{ik}^x & \text{if } i = j, \\ 0 & \text{otherwise.} \end{cases} \quad (8)$$

The energy to be minimized can then be expressed in terms of the potentials as $$E_\in(x) = x^T L^x x \quad (9)$$

$$= [x_U^T \; x_M^T] \begin{bmatrix} L_U^x & B^x \\ B^{xT} & L_M^x \end{bmatrix} \begin{bmatrix} x_U \\ x_M \end{bmatrix}$$

$$= x_U^T L_U^x x_U + 2 x_U^T B^x x_M + x_M^T L_M^x x_M,$$

where the vectors $x_M$ and $x_U$ refer to the potentials of the seeds and the unmarked points. Note that the dependencies of the matrices B and $L_M$ on the node potentials can be dropped. By the maximum principle, the potentials at the unmarked nodes always lie in (0,1) and therefore the orientation of the diodes is fixed in the immediate neighborhood of the seeds. Therefore the matrix B that contains the interconnections of the seeds with their unmarked neighbors, does not depend on the potentials x. By a similar argument, it is easy to see that the matrix $L_M$ does not depend on x.

Having formalized the definitions, in accordance with a further aspect of the present invention, a scheme is provided for minimizing the energy $E_\in(x)$ in the following Algorithm 1.

---

Algorithm 1 (Numerical Scheme for Energy Minimization)

---

Initialize the values of the potentials at the unmarked nodes by setting them to 0, i.e. $x_U^{(0)} = 0$.
Set i = 0;
While $| E_\in (x^{(i+1)}) - E_\in (x^{(i)}) | > \delta$
    Estimate $x_U^{(i+1)}$ as the minimizer of $x^T L^{x(i)} x$,
    that is given by $x_U^{(i+1)} = -[L_U^{x(i)}]^{-1} B x_M$
    i = i + 1
End

---

While Algorithm 1 is run once for each label (e.g., foreground and background represent two output labels, additional seeded foreground objects would result in additional labels) and the final labeling is computed by outputting the label for pixel i for which the solution $x^{(i)}$ is largest across all labels.

To verify that the proposed scheme always descends the energy function, consider the update of the unmarked potentials at the $i^{th}$ step that is given by the vector $dx^{(i)} = x_U^{(i+1)} - x_U^{(i)} = -(L_U^{x(i)})^{-1} [L_U^{x(i)} x_U^{(i)} + B x_M]$. Recall from equation (6) that $$\frac{\partial E_\in(x^{(i)})}{\partial x} \approx [L_U^{x(i)} x_U^{(i)} + B x_M].$$

One also knows from Lemma 1 that $L_U^{x(i)}$ is a positive definite matrix. This therefore provides the required result that at each step i, the update direction $dx^{(i)}$ is a descent direction at $dx^{(i)}$. Since the energy function is bounded below by a unique minimum, one is assured of the fact that the algorithm provided herein as an aspect of the present invention will converge to the correct solution. By changing, one can specify the tolerance limits of the algorithm as to how close one wants to be to the true solution.

Results

In this section the above method provided for segmenting an image as an aspect of the present invention will be tested on synthetic as well as real images. The segmentation results will be compared with those given by the random walker algorithm. The synthetic images are toy examples designed to clearly highlight the advantage of using the method provided as an aspect of the present invention over the random walker method, in order to get desired segmentations. Also results from real medical images will be provided to show that the method provided as an aspect of the present invention gets a much more accurate boundary of the object as compared to the random walker. In all experiments, the image intensities are used as features for segmentation. The user defined seeds are coded in the images as per the convention that green or a first type of seeds, correspond to the object and red or a second type of seeds correspond to the background. The segmentation results are displayed by marking the contour of the segmentation boundary.

Numerical Parameters

Figure 2:
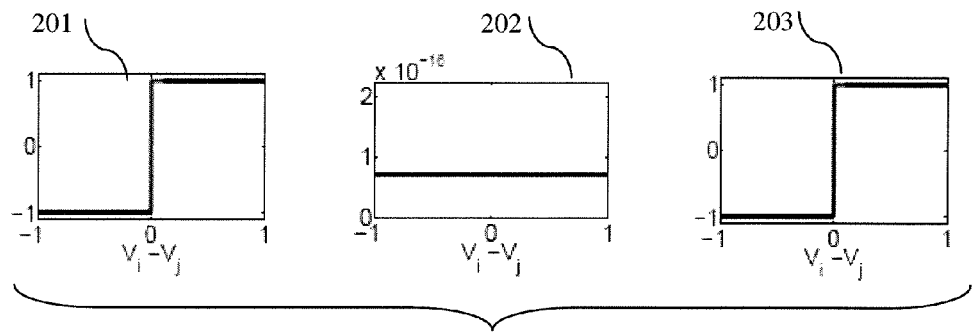
FIG. 2 illustrates approximations of an energy function in accordance with another aspect of the present invention.

The same parameters are used throughout all the experiments, therefore highlighting that the methods provided as an aspect of the present invention do not require any sort of parameter tuning for each test image. Since one would like to choose $\in$ as small as possible, it is set to the machine epsilon of MATLAB as $\in = 2.2204 \times 10^{-16}$. FIG. 2 contains 3 plots (201, 202 and 203) that help validate the assertions made above regarding the accuracy of various approximations. FIG. 2 plot 201 shows that the choice of using the sigmoidal function is indeed well founded and that the sigmoid helps model the hard classifier between either of the edge weights very accurately. FIG. 2 plot 202 shows that the term $$\frac{\in}{2\pi}\left(\frac{1}{R_{ij}} - \frac{1}{R_{ji}}\right)\frac{(x_i - x_j)^2}{\in^2 + (x_i - x_j)^2}$$

takes values less than $\in$ and is indeed insignificant. This therefore validates the assertions made before that equating $$\frac{\partial E_\in(x)}{dx_i} = 0,$$

$i \in U$ gives the same solution as Kirchhoff's current laws. Finally, FIG. 2 plot 203 adds weight to the statement provided above that the constraint $$\frac{2}{\pi}\left[\tan^{-1}\left(\frac{x_i - x_j}{\in}\right) + \in\left(\frac{(x_i - x_j)^2 + 2\in^2}{(x_i - x_j)^2 + \in^2}\right)(x_i - x_j)\right] \in (-1, 1)$$

is satisfied for small $\in$. It is noted that this expression actually lies in the interval $(-1-\in, 1+\in)$ rather than $(-1, 1)$, but this does not affect the results in practice.

The Legends for the Y-axes in the plots 201, 202 and 203 of FIG. 2 are different and are:

FIG. 2, plot 201 along the Y-axis shows:

$$\tan^{-1}\left(\frac{x_i - x_j}{\in}\right);$$

FIG. 2, plot 202 along the Y-axis shows:

$$\frac{\in}{2\pi}\left(\frac{1}{R_{ij}} - \frac{1}{R_{ji}}\right)\frac{(x_i - x_j)^2}{\in^2 + (x_i - x_j)^2};$$

FIG. 2, plot 203 along the Y-axis shows:

$$\frac{2}{\pi}\left[\tan^{-1}\left(\frac{x_i - x_j}{\in}\right) + \in\left(\frac{(x_i - x_j)^2 + 2\in^2}{(x_i - x_j)^2 + \in^2}\right)(x_i - x_j)\right].$$

For the purpose of directed edges, two parameters are defined that decide the value of an edge weight based on the difference in intensities across the edge. The parameter $\beta_{hl}$ is used to define the penalty when there is a fall in the intensity value across an edge, i.e. $w_{ij} = e^{-\beta_{hl}|I_i - I_j|^2}$, if $I_i > I_j$. Similarly, the parameter $\beta_{lh}$ is used to define the penalty when there is an increase in the intensity value across the edge i.e. $w_{ij} = e^{-\beta_{lh}|I_i - I_j|^2}$, if $I_i < I_j$. Therefore, if one wants to penalize an increase in the intensity more than a decrease, one can set the parameters for the algorithm herein provided to be for instance $(\beta_{lh}, \beta_{hl}) = (90, 10)$. In the case of the random walker, a single $\beta$ is used for all the edges and its value is fixed to be 90 across all experiments for a fair comparison. The parameter $\delta$ is fixed in Algorithm 1 to be $5 \times 10^{-4}$ and the maximum number of iterations is restricted to 15. In practice, the algorithm usually converges within 6-7 steps.

Synthetic Images

Figure 3:
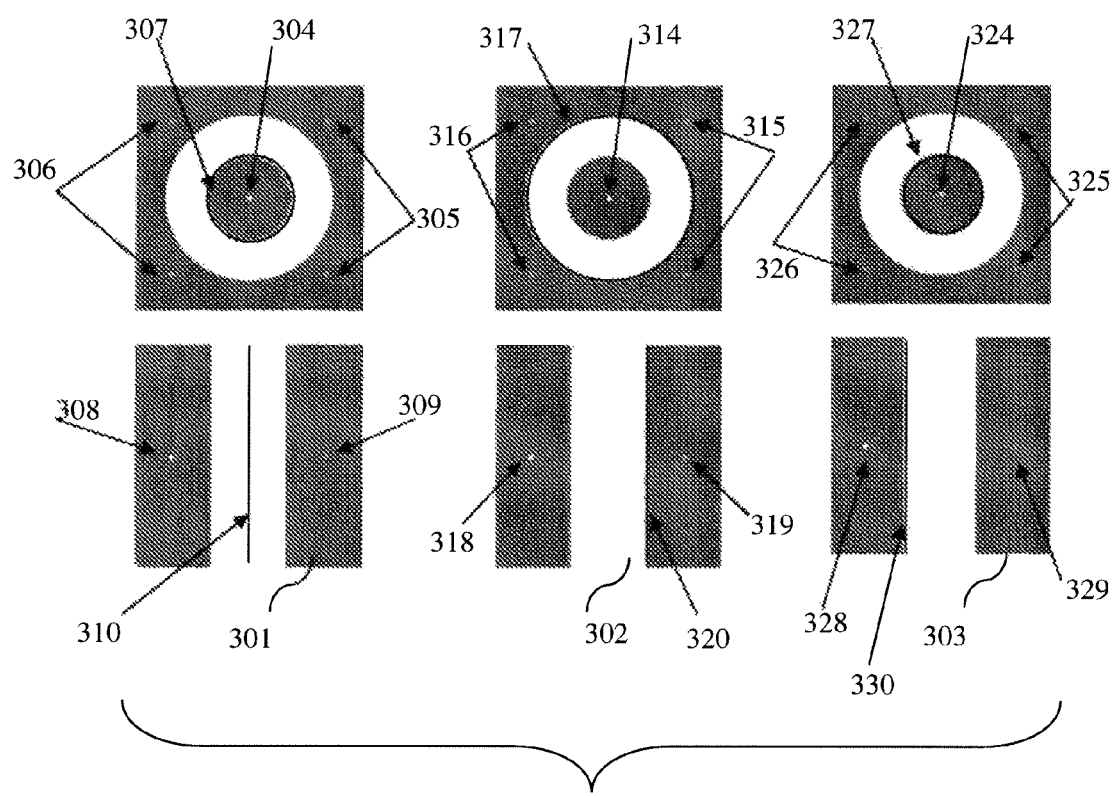
FIG. 3 illustrates segmentation of synthetic images in accordance with another aspect of the present invention.

FIG. 3 compares the segmentation results of the method herein provided as an aspect of the present invention and the random walker algorithm when applied to synthetic images. The images are created such that the user is faced with multiple possible choices for the object boundary. The first image 301 of size 257×257 contains a light-grey disc (I=0.5) against a darker background (I=0) on the top and a light grey vertical bar (I=0.5) against a darker back ground (I=0) on the bottom of the column. In the circle image, one would like to have the ability to place the object boundary at the inner or outer circle of the disc. Note that the random walker always places the object boundary at the inner circle. The image 301 has foreground seeds 304 in the circle and 308 in the bar and background seeds 305, 306 and 309. The circle 307 is the segmentation as provided by the random walker. The method as provided as an aspect of the present invention on the other hand can obtain either of the circles as the object boundary, by choosing whether one wants to place a harder penalty on the increase or decrease in intensity values. The second part of image 301 is of size 256×256 is similar in nature and contains a light-grey bar (I=0.5) against a darker background (I=0). As motivated earlier, one would like to be able to place the object boundary at either edge of the bar. The random walker however always places the object boundary at the centre of the image at 310 due to symmetry of the image with respect to the seeds. The method provided herein as an aspect of the present invention however, can obtain either of the desired segmentations. In image 302, using a segmentation method as disclosed herein has as foreground seeds 314 and 318 and as background seeds 315, 316 and 319. The generated segmentation contours in 302 are 317 and 320. In FIG. 3 image 303, using a segmentation method as disclosed herein has as foreground seeds 324 and 328 and as background seeds 325, 326 and 329. The generated segmentation contours in 303 are 327 and 330. Accordingly, the segmentation method provided as an aspect of the present invention can obtain desired segmentation based on the different penalties for increases in intensity values and decrease in intensity values. The parameters used are $(\beta_{lh}, \beta_{hl})=(10,90)$ for the column of image 302 and $(\beta_{lh}, \beta_{hl})=(90,10)$ for the column of image 303.

Figure 4:
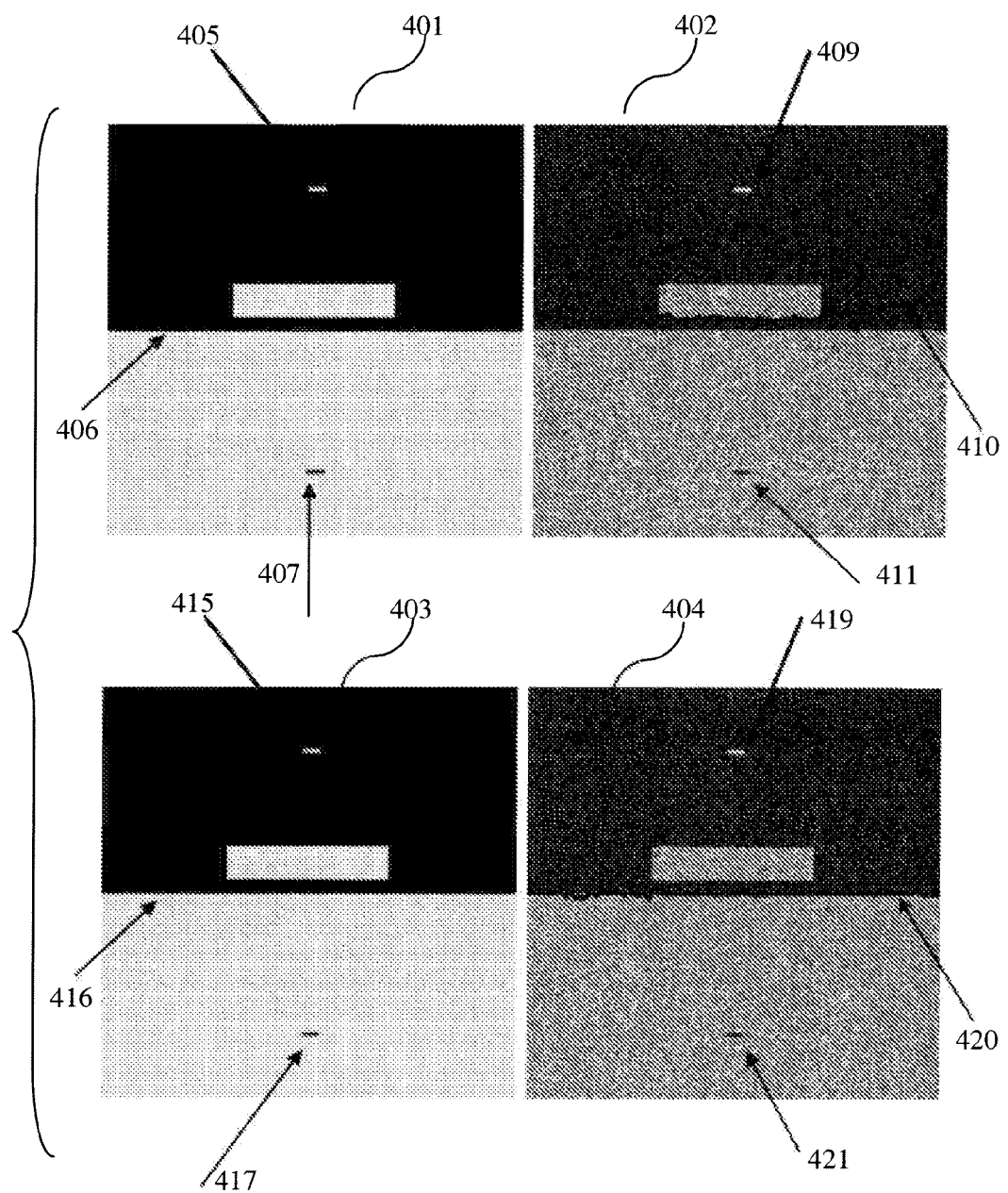
FIG. 4. illustrates segmentation of other synthetic images in accordance with another aspect of the present invention.

FIG. 4 provides a clear demonstration of the advantage of using the method which is provided in accordance with n aspect of the present invention as opposed to the random walker algorithm. FIG. 4 image 401 is an 256×256 image which is symmetrically divided into regions with low intensity (I=0) and high intensity (I=1). The low intensity region however contains a small bar of high intensity near the boundary. As will be evident in the real images that will be presented later, this scenario is very representative of medical images. Note that in the absence of noise, the here provided method as an aspect of the present invention and the random walker algorithm can segment the image correctly. FIG. 4 image 401 and 403 are identical. They have foreground seed 405 and 415, and background seed 407 and 417. Image 401 applies the random walker and 403 applies the method which is provided as an aspect of the present invention. The generated segmentation contour in image 401 is 406 and the segmentation contour in image 404 is 416. Both contours are identical. When noise is added with uniform distribution between 0 and 1, one can see in image 402 that the segmentation given by the random walker method degrades. In 402 foreground seed is 409 and background seed is 411, which coincide with earlier seeds. The segmentation contour provided by the random walker is 410, which clearly does not coincide with the earlier segmentation contour 406 or 416. The contour 410, and other contours in other images which are generated by methods provided herein as aspects of the present invention are highlighted to provide better contrast and show the differences with other segmentation contours, for instance generated by the random walker.

One can use the herein provided method which is an aspect of the present invention to get a better segmentation in an image with noise. This is shown in image 404 which is the image 401 with noise, with seeds 419 and 421. The segmentation is done by adopting a scheme of different penalties, where one sets $(\beta_{lh}, \beta_{hl})=(90,10)$ in order to enforce the constraint that the object is at lower intensity as compared to the background.

As mentioned earlier, the random walker algorithm is a special case of the framework that is provided as an aspect of the present invention. Therefore, the method can achieve the same segmentation given by the random walker by fixing $\beta_{lh}=\beta_{hl}=\beta$. Also, note that in the mentioned experiments, it is possible to change the seeds' locations and get the desired segmentation using the random walker framework. However, it is preferable that a segmentation algorithm offers a user the freedom to obtain various intuitive segmentations while keeping the seeds' locations fixed. Therefore, the segmentation method which is provided as an aspect of the present invention is indeed advantageous to use as compared to the random walker.

Real Images

Figure 5:
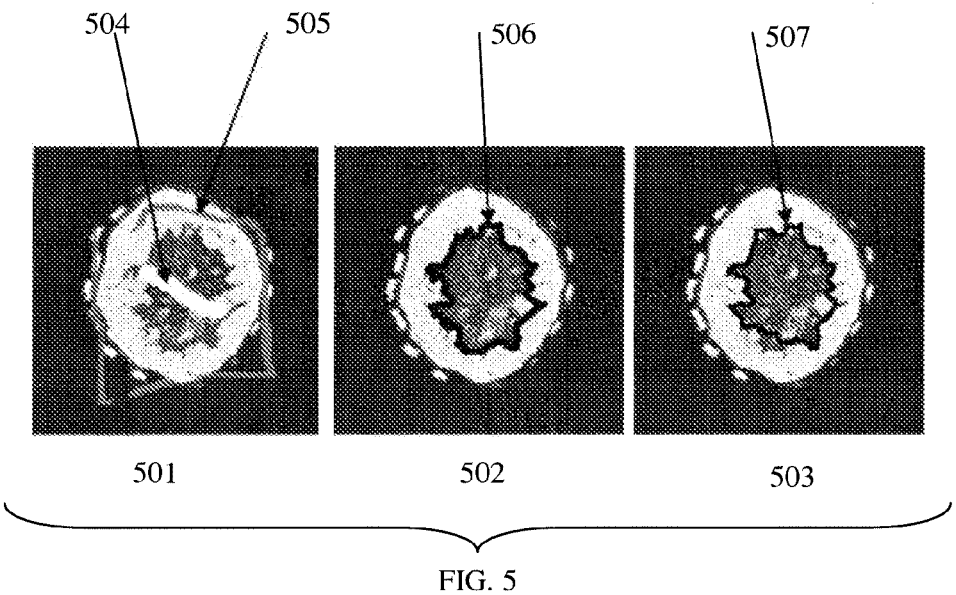
FIG. 5. illustrates segmentation of an image in accordance with an aspect of the present invention.
Figure 6:
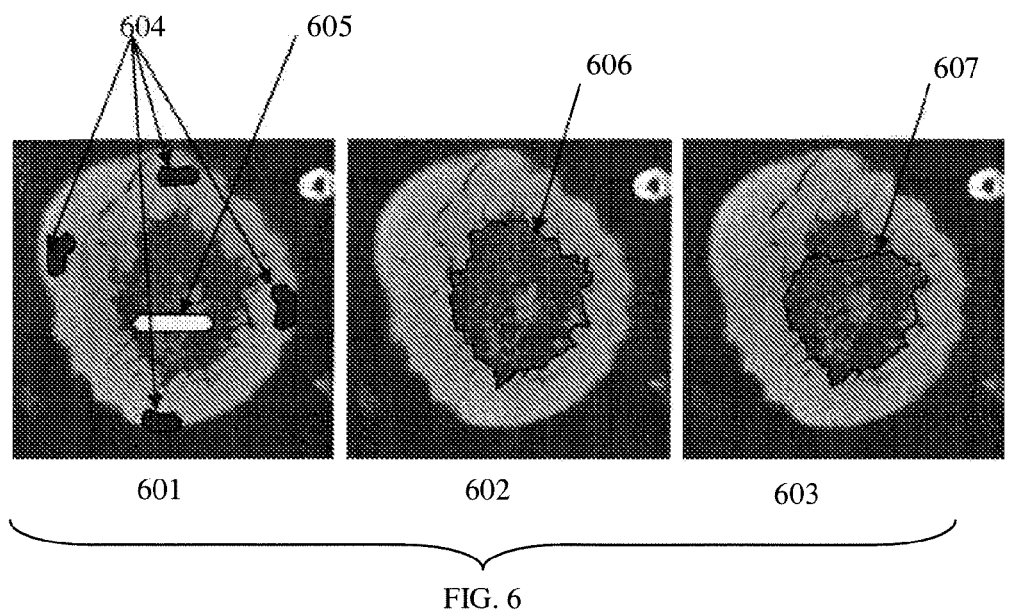
FIG. 6. illustrates segmentation of another image in accordance with an aspect of the present invention.
Figure 7:
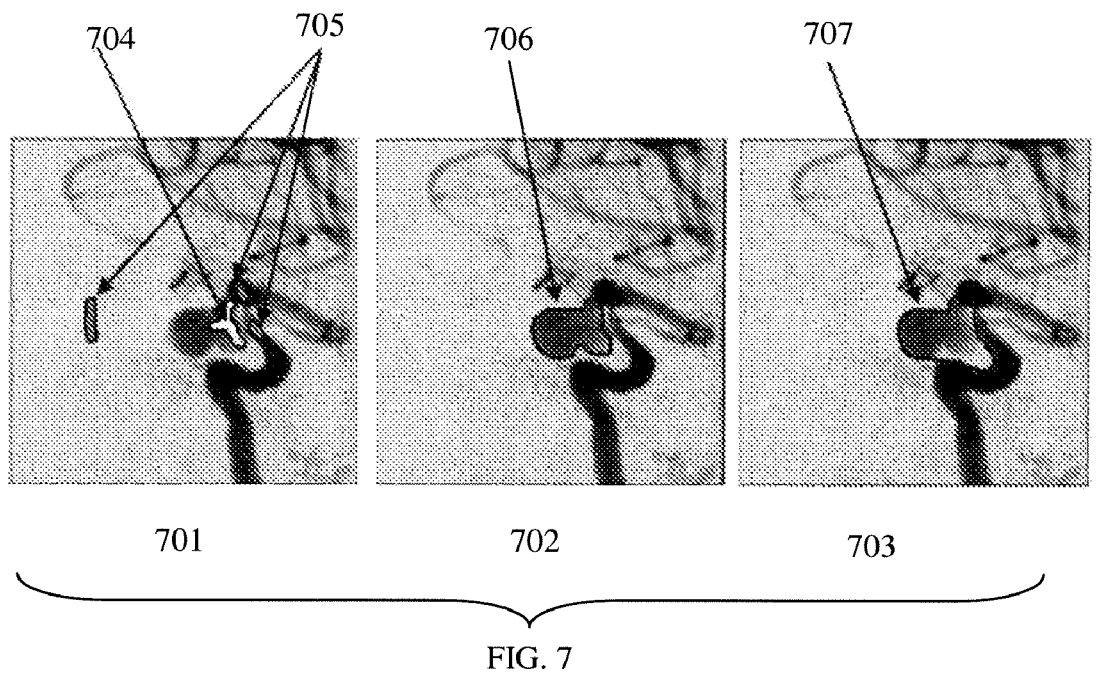
FIG. 7. illustrates segmentation of yet another image in accordance with an aspect of the present invention.
Figure 8:
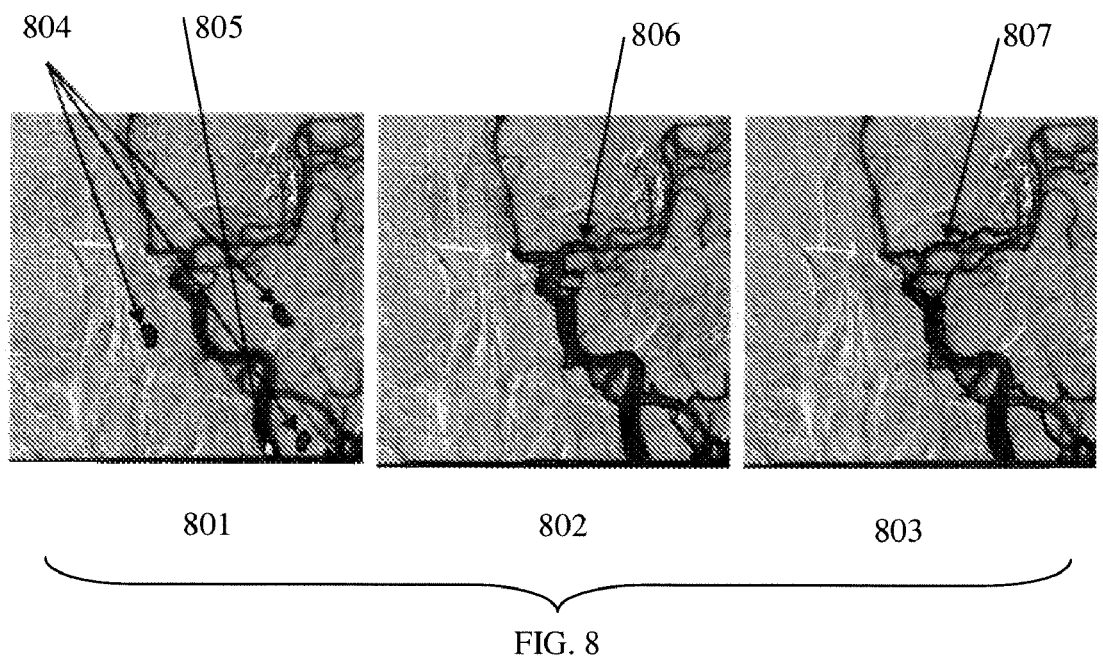
FIG. 8. illustrates segmentation of yet another image in accordance with an aspect of the present invention.

One can compare the performance in accordance with an aspect of the present invention to segment real medical images (mostly of size 256×256) with that of the random walker algorithm. FIGS. 5-8 contain segmentation results on images in which a harder penalty is enforced for increase in intensities, i.e. $(\beta_{lh}, \beta_{hl})=(90,10)$. In FIG. 5-8 each figure has three images: FIG. 5 has images 501, 502, 503; FIG. 6 has images 601, 602 and 603; FIG. 7 has images 701, 702 and 703; and FIG. 8 has images 801, 802 and 803. The first images 501, 601, 701 and 801 are the original images to be segmented with foreground and back ground seeds. Image 501 has 504 as foreground seed and 505 as background seed. Image 502 shows the highlighted segmentation contour 506 achieved in accordance with an aspect of the present invention, and image 503 shows highlighted segmentation contour 507 achieved by the random walker. Image 601 has 605 as foreground seed and 604 as background seeds. Image 602 shows the highlighted segmentation contour 606 achieved in accordance with an aspect of the present invention, and image 603 shows highlighted segmentation contour 607 achieved by the random walker. Image 701 has 704 as foreground seed and 705 as background seeds. Image 702 shows the highlighted segmentation contour 706 achieved in accordance with an aspect of the present invention, and image 703 shows highlighted segmentation contour 707 achieved by the random walker. Image 801 has 805 as foreground seed and 804 as background seeds. Image 802 shows the highlighted segmentation contour 806 achieved in accordance with an aspect of the present invention, and image 803 shows highlighted segmentation contour 807 achieved by the random walker. Results on real images of FIGS. 5-8: segmentation in accordance with an aspect of the present invention penalizes rises in intensity ($\beta_{lh}=90$) more than the drops in intensity ($\beta_{hl}=10$). The random walker penalizes all the drops uniformly with $\beta=90$.

Figure 9:
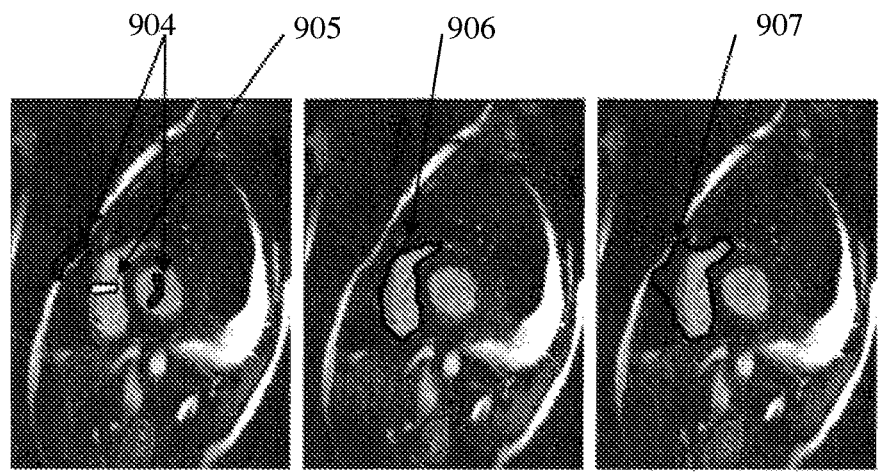
FIG. 9. illustrates segmentation of an image in accordance with another aspect of the present invention.
Figure 10:
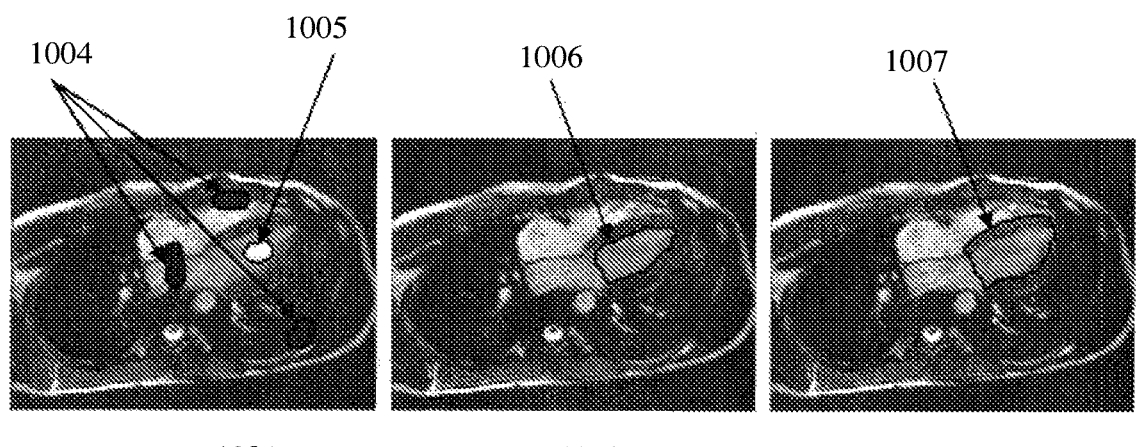
FIG. 10. illustrates segmentation of another image in accordance with an aspect of the present invention.
Figure 11:
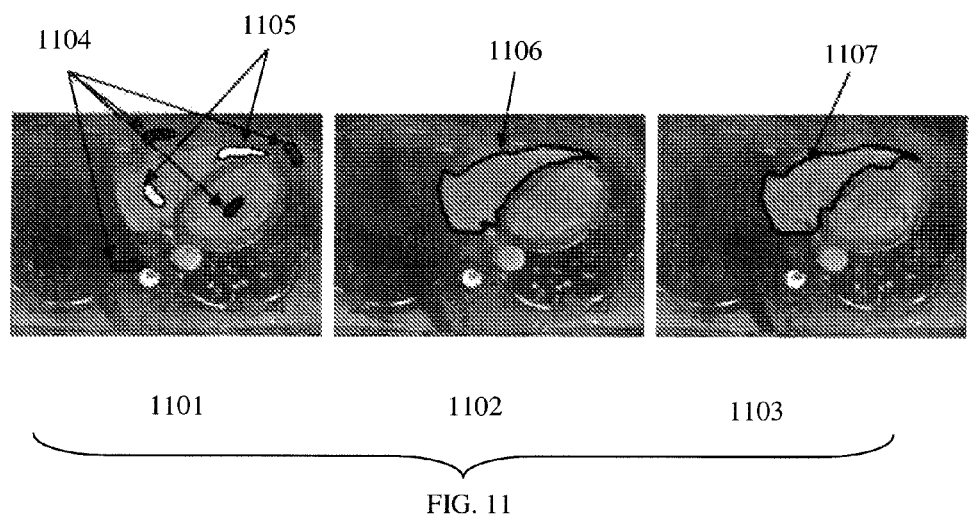
FIG. 11. illustrates segmentation of yet another image in accordance with an aspect of the present invention.
Figure 12:
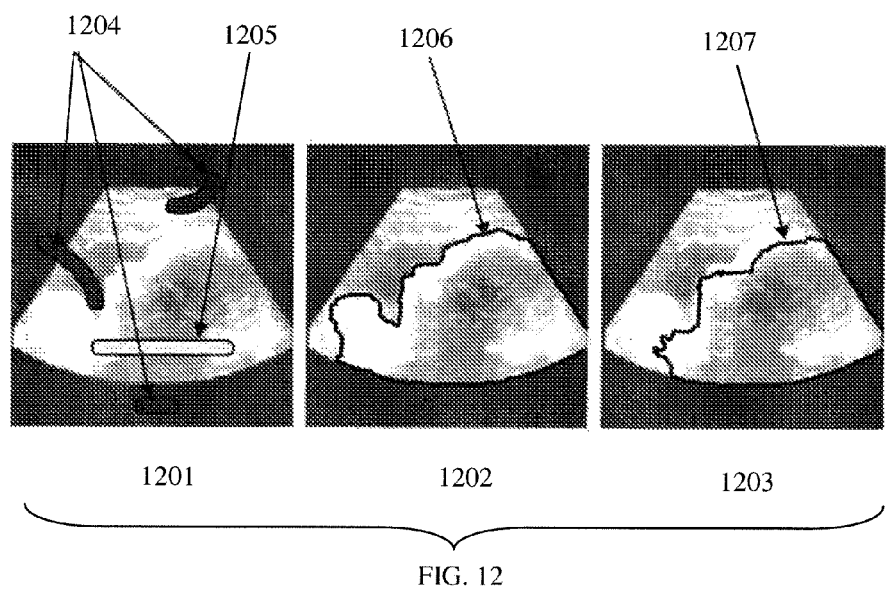
FIG. 12. illustrates segmentation of yet another image in accordance with an aspect of the present invention.

FIGS. 9-12 contain results on images in which a harder penalty is enforced for decrease in intensities, i.e. $(\beta_{lh}, \beta_{hl})=(10,90)$. In most images, the image contrast at the object boundary is not very high, thereby causing the random walker to place erroneous boundaries at the sharpest edges close to the true boundary. In addition, there are cases when the effect of the seeds is restricted by the random walker algorithm to a neighborhood that is smaller than one would like. This is due to the presence of sharp edges close to the seeds. One can see in FIGS. 9-12 that segmentation performed in accordance with an aspect of the present invention is able to get better segmentations and obtain a more accurate boundary, as is effectively reflected in the images of FIGS. 9-12. Each of FIGS. 9-12 has 3 images. In FIG. 9 image 901 has 905 as foreground seed and 904 as background seeds. Image 902 shows the highlighted segmentation contour 906 achieved in accordance with an aspect of the present invention, and image 903 shows highlighted segmentation contour 907 achieved by the random walker. In FIG. 10 image 1001 has 1005 as foreground seed and 1004 as background seeds. Image 1002 shows the highlighted segmentation contour 1006 achieved in accordance with an aspect of the present invention, and image 1003 shows highlighted segmentation contour 1007 achieved by the random walker. In FIG. 11 image 1101 has 1105 as foreground seeds and 1104 as background seeds. Image 1102 shows the highlighted segmentation contour 1106 achieved in accordance with an aspect of the present invention, and image 1103 shows highlighted segmentation contour 1107 achieved by the random walker. In FIG. 12 image 1201 has 1205 as foreground seed and 1204 as background seeds. Image 1202 shows the highlighted segmentation contour 1206 achieved in accordance with an aspect of the present invention, and image 1203 shows highlighted segmentation contour 1207 achieved by the random walker. FIGS. 9-12 results on real images: segmentation in accordance with an aspect of the present invention penalizes drops in intensity ($\beta_{hl}=90$) more than the rises in intensity ($\beta_{lh}$=10). The random walker penalizes all the drops uniformly with $\beta$=90.

Selection of Penalty Schemes

Note that for all the results provided herein, the penalty schemes have been fixed manually. Given the object that needs to be segmented, one may let the algorithm know whether it should place higher penalties on increases or decreases in intensity. In reality, one would like to have a system that can automatically deduce the penalty scheme, in order to reduce the dependency on a user. A simple step can be incorporated in accordance with an aspect of the present invention for to reducing the dependency on a user. The seeds marked by users can be used to create the intensity profiles of the object and the background. One can use these intensity profiles to calculate the probability that an unmarked node belongs to the object or the background. Note that this probability is calculated solely on basis of intensity. Having calculated the probability $P_i$ at each of the nodes $v_i$, one now has an image of the probabilities. The image takes values between 0 and 1, with 1 and 0 corresponding to the object and the background respectively. One may then run the algorithm on this image in accordance with an aspect of the present invention by constructing a graph with the scheme as provided in the following table for fixing the edge weight of the edge $e_{ij}$.

| Condition | Edge weights |
|---|---|
| $P_i \geq P_j$ | $w_{ij} = e^{-\beta_h(P_i - P_j)^2}$ |
| $P_i < P_j$ | $w_{ij} = e^{-\beta_l(P_i - P_j)^2}$ |

The above table provides the selection of the edge weight for an edge $e_{ij}$ ($\beta_h > \beta_l$). By placing a higher penalty on currents flowing from the object to the background than in the reverse direction, one ensures that the segmentation boundary is tight with respect to the object's boundary. Note that once the graph is constructed, the algorithm proceeds exactly as described in the earlier sections. One may set x=1 and x=0 at seeds corresponding to the object and background respectively. The values of x at the unmarked nodes are obtained using Algorithm 1 and then a decision boundary is placed at x=0.5 to get the desired segmentation.

In summary: a novel algorithm for interactive image segmentation has been presented that solves the problem by minimizing an energy function on a combinatorial graph. The graph has directed edges and the edge weights are chosen by enforcing different penalties for increase or decrease in the intensity values. The proposed energy function is convex and the optimization scheme provably converges to the global minimum, the existence and uniqueness of which is guaranteed. Comprehensive testing shows that one gets better results than the random walker algorithm, which in fact is just a special case of the method provided herein in accordance with an aspect of the present invention. Parallels were drawn with an equivalent construction of the method provided herein in accordance with an aspect of the present invention in the electrical network theory, in order to provide the reader with more intuition and open up new avenues for further research. While intensity was used as a cue to segment the images, one can use the scheme for segmenting any feature vector in general. The performance of the provided algorithm in such a case would depend upon how the user defines the classification rule for imposing different penalties.

Figure 13:
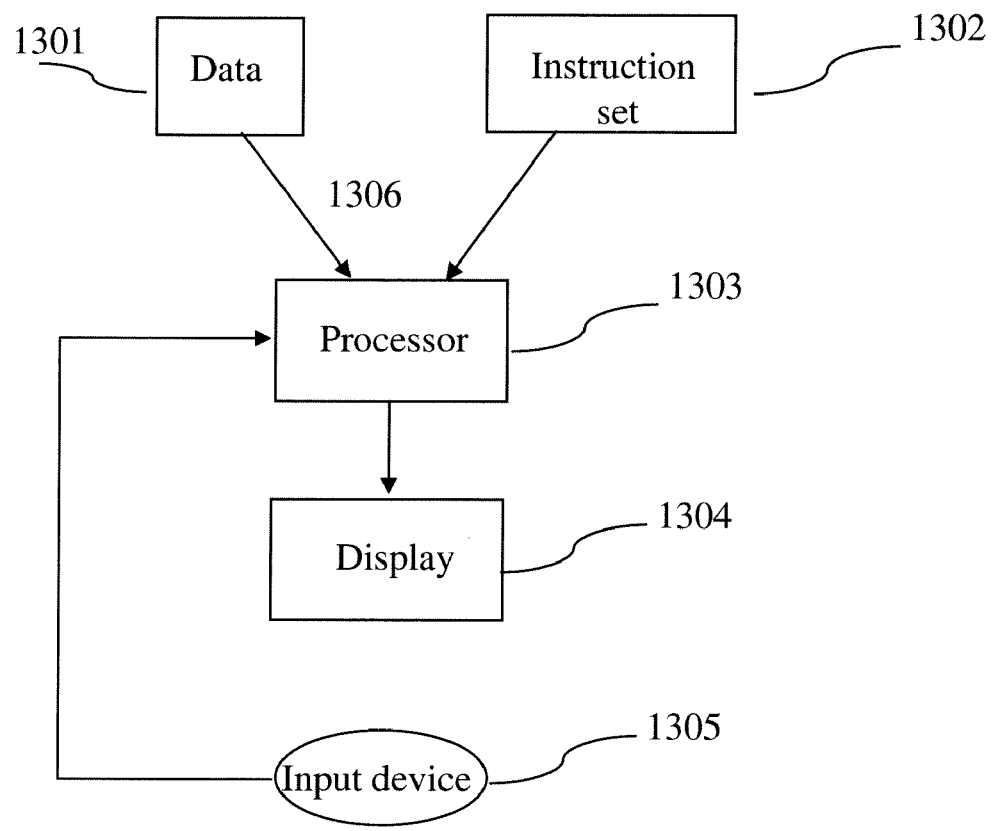
FIG. 13 illustrates a computer system that is used to perform the steps described herein in accordance with another aspect of the present invention.

The image segmentation that is provided as an aspect of the present invention, can be executed by a system as shown in FIG. 13. The system is provided with data 1301 representing image data. Image data may be provided on an input 1306 to a processor 1303. An instruction set or program 1302 executing the methods of the present invention is provided. It may be stored in memory and made available from memory to processor 1303, which can process the instructions of 1302 and apply it to the data 1301, which may also be stored in a memory. An image, such as a segmented image can be outputted on a device 1304. Such a device for instance can be a display. The processor can be dedicated hardware. However, the processor can also be a CPU or any other computing device that can execute the instructions of 1302. An input device 1305 like a mouse, or track-ball or other input device may be present to allow a user to for instance place foreground and background seeds in an image provided for instance on the display 1304. The input device may also be used to start or stop instructions on the processor. Accordingly, the system as shown in FIG. 13 provides a system for image segmentation using methods disclosed herein.

The herein provided methods and systems as an aspect of the present invention use the term pixel and examples are provided for two-dimensional images. It is well known that applications of segmentation methods and systems operate on more dimensional data such as 3 dimensional data volumes as for instance used in medical imaging. The herein provided segmentation methods and systems of directed graphs can be applied to segmentation of higher dimensional objects in higher dimensional data structures. Such applications are fully contemplated as an aspect of the present invention. The term pixel herein also intends to cover the term voxel.

The following references are generally descriptive of the background of the present invention and are hereby incorporated herein by reference: Y. Boykov and G. Funka-Lea. Graph Cuts and Efficient N-D Image Segmentation. *International Journal of Computer Vision*, 70(2):109-131, 2006. 1; Y. Boykov and M.-P. Jolly. Interactive Graph Cuts for optimal Boundary and Region Segmentation of Objects in N-D Images. In *ICCV*, pages 105-112, 2001. 1; L. Grady. Random Walks for Image Segmentation. *IEEE Trans. Pattern Anal. Mach. Intell*, 28(11):1768-1783, 2006. 2.

While there have been shown, described and pointed out fundamental novel features of the invention as applied to preferred embodiments thereof, it will be understood that various omissions and substitutions and changes in the form and details of the methods and/or devices illustrated and in their operation may be made by those skilled in the art without departing from the spirit of the invention. It is the intention, therefore, to be limited only as indicated by the scope of the claims appended hereto.

The invention claimed is:

1. A method for segmentation of an object from a background in an image having a plurality of pixels, comprising:
on a processor, defining an energy function on a combinatorial graph, the combinatorial graph having directed edges between nodes, the energy function depending on the value of a first and a second edge weight of a directed edge, the energy function being determined by an expression $$E(x) = \sum_{e_{ij} \in \varepsilon} [w_{ij} I(x_i \geq x_j) + w_{ji} I(x_i < x_j)](x_i - x_j)^2,$$

wherein E(x) is an energy of a weighted graph formed by a function associated to nodes x, $e_{ij} \in \varepsilon$ are edges in the weighted graph between nodes i and j, $w_{ij}$ is a weight of an edge $e_{ij}$, I is an indicator function, and $x_i$ and $x_j$ are the values of node i and node j, respectively;

creating a contour that segments the plurality of pixels into background and foreground pixels by determining a minimizer of the energy function by the processor; and generating by the processor to a display an image that contains a segmentation of the object.

2. The method as claimed in claim 1, wherein the energy function is approximated by a differentiable function which descends to a minimum.

3. The method as claimed in claim 1, wherein the first and the second edge weight of the directed edge are different.

4. The method as claimed in claim 2, wherein an approximation of the energy function can be expressed as $$E_\in(x) = \sum_{e_{ij} \in \varepsilon} \frac{(x_i - x_j)^2}{2R_{ij}} \left(1 + \frac{2}{\pi} \tan^{-1}\left(\frac{x_i - x_j}{\in}\right)\right) +$$

$$\sum_{e_{ij} \in \varepsilon} \frac{(x_i - x_j)^2}{2R_{ji}} \left(1 - \frac{2}{\pi} \tan^{-1}\left(\frac{x_i - x_j}{\in}\right)\right),$$

wherein $R_{ij}$ is an inverse of $e_{ij}$ and $\in$ is an arbitrary value.

5. The method as claimed in claim 2, further comprising determining the minimizer in a plurality of iterative steps.

6. The method as claimed in claim 1, wherein the weight of a directed edge between a first and a second node depends on an increase of intensity going from the first to the second node.

7. The method as claimed in claim 1, wherein the weights of a directed edge between a first and a second node are determined automatically based on an image feature at object and background seeds.

8. A system for segmentation of an object from a background in an image having a plurality of pixels, comprising:
a processor;
a memory readable by the processor, the memory comprising program code executable by the processor, the program code adapted to perform the following steps:
defining an energy function on a combinatorial graph, the combinatorial graph having directed edges between nodes, the energy function depending on the value of a first and a second edge weight of a directed edge, the energy function being determined by an expression $$E(x) = \sum_{e_{ij} \in \varepsilon} [w_{ij}I(x_i \geq x_j) + w_{ji}I(x_i < x_j)](x_i - x_j)^2,$$

wherein E(x) is an energy of a weighted graph formed by a function associated to nodes x, $e_{ij} \in \epsilon$ are edges in the weighted graph between nodes i and j, $w_{ij}$ is a weight of an edge $e_{ij}$, I is an indicator function and $x_i$ and $x_j$ are the values of node i and node j, respectively; and
creating a contour that segments the plurality of pixels into background and foreground pixels by determining a minimizer of the energy function.

9. The system as claimed in claim 8, wherein the energy function is approximated by a differentiable function which descends to a minimum.

10. The system as claimed in claim 8, wherein the first and the second edge weight of the directed edge are different.

11. The system as claimed in claim 9, wherein an approximation of the energy function can be expressed as $$E_\in(x) = \sum_{e_{ij} \in \varepsilon} \frac{(x_i - x_j)^2}{2R_{ij}} \left(1 + \frac{2}{\pi} \tan^{-1}\left(\frac{x_i - x_j}{\in}\right)\right) +$$

$$\sum_{e_{ij} \in \varepsilon} \frac{(x_i - x_j)^2}{2R_{ji}} \left(1 - \frac{2}{\pi} \tan^{-1}\left(\frac{x_i - x_j}{\in}\right)\right),$$

wherein $R_{ij}$ is an inverse of $w_{ij}$ and $\in$ is an arbitrary value.

12. The system as claimed in claim 9, further comprising determining the minimizer in a plurality of iterative steps.

13. The system as claimed in claim 9, wherein the weight of a directed edge between a first and a second node depends on an increase of intensity going from the first to the second node.

14. The system as claimed in claim 8, wherein the weights of a directed edge between a first and a second node are determined automatically based on an image feature at object and background seeds.

15. A method for segmentation of an object from a background in an image having a plurality of pixels wherein one or more pixels are marked as object, one or more pixels are marked as background and the remaining pixels are unmarked, comprising:
instructing a processor to perform a Random Walker segmentation method which is a segmentation determined from a solution to a Dirichlet problem with boundary conditions given by foreground and background seeds to obtain a labeling of an unmarked pixel as a probability of whether a random walker starting from the unmarked pixel would first reach the object or the background adapted to a combinatorial graph having directed edges between nodes, a node of a graph representing a pixel of the image;
segmenting the object from the background by the adapted Random Walker method; and
generating by the processor to a display an image that contains a segmentation of the object.

16. The method as claimed in claim 15, wherein the adapted Random Walker segmentation method creates a contour that segments the plurality of pixels into background and object pixels by determining a minimizer of an energy function related to values of nodes and directed edges between nodes which can be expressed as $$E(x) = \sum_{e_{ij} \in \varepsilon} [w_{ij}I(x_i \geq x_j) + w_{ji}I(x_i < x_j)](x_i - x_j)^2,$$

wherein E(x) is an energy of a weighted graph formed by nodes x, $e_{ij}^{TM}\epsilon$ are the edges in the weighted graph between nodes i and j, $w_{ij}$ is a weight of an edge $e_{ij}$, I is an indicator function, and $x_i$ and $x_j$ are the values of node i and node j, respectively.

17. The method as claimed in claim 16, wherein the energy function is approximated by a differentiable function.

18. The method as claimed in claim 17, wherein the differentiable function can be can be expressed as $$E_\in(x) = \sum_{e_{ij} \in \varepsilon} \frac{(x_i - x_j)^2}{2R_{ij}} \left(1 + \frac{2}{\pi}\tan^{-1}\left(\frac{x_i - x_j}{\in}\right)\right) +$$

$$\sum_{e_{ij} \in \varepsilon} \frac{(x_i - x_j)^2}{2R_{ji}} \left(1 - \frac{2}{\pi}\tan^{-1}\left(\frac{x_i - x_j}{\in}\right)\right),$$

wherein $R_{ij}$ is an inverse of $e_{ij}$ and $\in$ is an arbitrary value.

19. The method as claimed in claim 18, further comprising the steps:
   initializing the values of unmarked nodes as previous minimizers;
   estimating a current minimizer of the differentiable energy function;
   making the current minimizer the previous minimizer if a difference between the current and the previous minimizer exceeds a preset number; and
   repeating the previous 2 steps.

20. The method as claimed in claim 15, wherein the weights of a directed edge between a first and a second node are determined automatically based on object and background seeds.

* * * * *